C. KEIBEL.
POTATO HARVESTING MACHINE.
APPLICATION FILED OCT. 7, 1908.

904,264.

Patented Nov. 17, 1908.

Witnesses
Cha. H. Smith
A. La Serrell

Inventor
Carl Keibel
per Harold Serrell
his atty

THE NORRIS PETERS CO., WASHINGTON, D. C.

UNITED STATES PATENT OFFICE.

CARL KEIBEL, OF KOTTBUS, GERMANY.

POTATO-HARVESTING MACHINE.

No. 904,264.

Specification of Letters Patent.

Patented Nov. 17, 1908.

Application filed October 7, 1908. Serial No. 456,635.

*To all whom it may concern:*

Be it known that I, CARL KEIBEL, a subject of the King of Prussia, residing at 43 Lausitzerstrasse, Kottbus, Germany, have invented new and useful Improvements in Potato-Harvesting Machines; and I do hereby declare the following to be a full, clear, and exact description of the invention.

The invention relates to that kind of potato-harvesting machines, in which a delivery-wheel formed of rods or tines and having a centrifugal action on the material raised by the share is rotated in an inclined plane lying in the direction of the share and in which a lateral discharge-screen is mounted at the rear on the share.

In machines of this kind, with dry easily sifted soil, there is the disadvantage that in the jerky movement of the draft-animals potatoes occasionally fall through between the rods or tines of the delivery-wheel, instead of being discharged laterally by the rotary delivery-wheel.

In order to obviate this disadvantage, in the new share-attachment immediately behind the share beneath the delivery-wheel and parallel thereto, according to my invention I arrange a grid, the bars of which lie in the direction of rotation of the delivery-wheel, so that the potatoes which fall through between the rods or tines of the said delivery wheel slide on the bars of the said grid and are likewise driven against the lateral discharge-screen.

Figure 1:
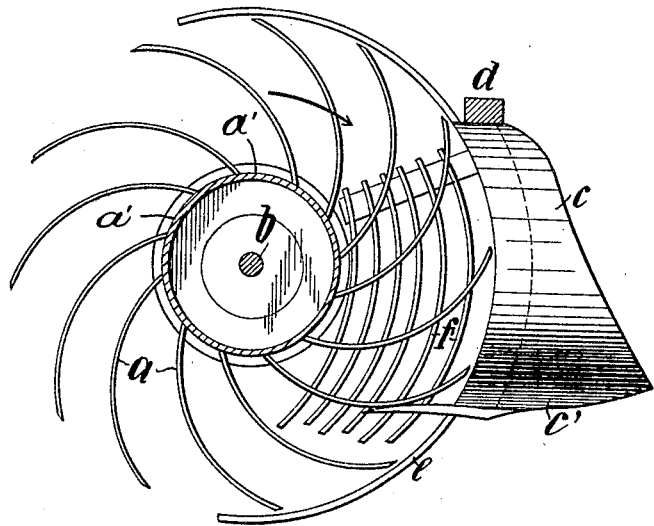
Figure 2:
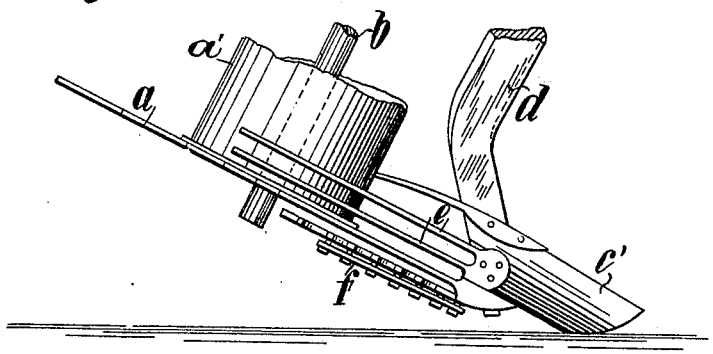

In the drawing, Figure 1 is a plan and partial section of a potato-harvesting machine illustrating my present invention, and Fig. 2 is a side elevation and partial section thereof.

The delivery wheel is fixed on a driving shaft $b$ which is somewhat inclined towards the front of the machine and which is driven in any suitable manner. This delivery wheel preferably comprises a hollow hub $a'$ of relatively large diameter and a series of suitably spaced apart curved rods or tines $a$, all of which are secured on the lower edge of the said hub. These plain rods or tines $a$ enable the delivery wheel to easily pierce the plowed earth.

On the side remote from the stem $d$ of the share, at the rear, is fixed on the share $c$ the lateral discharge-screen $e$, towards which, in the rotation of the delivery-wheel in the direction of the arrow (Fig. 1), the potaotes are delivered; the edge $c'$ of the share is bent upwards to such a height (Fig. 2) that no potatoes can fall down beyond it, although the potato-tops or stems slide away easily over this edge $c'$. This however is not the subject of the present invention.

Directly behind the share $c$ is arranged the grid $f$ beneath the delivery-wheel and parallel therewith. This grid is to prevent the potatoes from falling to the ground between the rods or tines of the delivery-wheel and being covered up. If the potatoes pass over from the share on to this grid $f$, they will be seized by the rods or tines $a$ of the delivery-wheel moving over the same and, sliding on the bars of the grid $f$, will be driven against the lateral discharge-screen $e$. In order to effect this sliding of the potatoes, the bars of the grid $f$ extend in the direction of rotation of the delivery-wheel and not, as is well-known in other machines, in the direction of motion of the machine. For efficient operation of the machine, it is absolutely necessary that all the potatoes be driven by the delivery-wheel against the lateral screen $e$, in order that they may be freed from earth and be deposited at one side at the end of the screen $e$ by the delivery-wheel, after the earth has been sifted off through the rods or tines of the delivery-wheel and the bars of the lateral screen. If the bars of the grid $f$ be arranged in the direction of motion of the machine, the potatoes could not slide thereon and the travel of the machine would be rendered more difficult. Also single potatoes would be driven through between the bars of the grid $f$ to the ground, which for an efficient operation of the machine must be avoided.

I claim:

In a potato-harvesting machine, the combination with a share, a lateral discharge-screen and a delivery-wheel having a series of tines and which turns in an inclined plane lying in the direction of the share, of a grid beneath the delivery-wheel and parallel therewith, the members of which grid extend in the direction of rotation of the delivery-wheel and cause the potatoes falling through between the tines of the said wheel to slide against the said lateral discharge screen.

In testimony that I claim the foregoing as my invention, I have signed my name in presence of two subscribing witnesses.

CARL KEIBEL.

Witnesses:
  JOHANNES HEIN,
  WOLDEMAR HAUPT.